United States Patent [19]
Cox et al.

[11] Patent Number: 5,435,004
[45] Date of Patent: Jul. 18, 1995

[54] COMPUTERIZED SYSTEM AND METHOD FOR DATA BACKUP

[75] Inventors: James O. Cox; James M. Mott, both of Austin, Tex.

[73] Assignee: International Business Machines Corporation, Armonk, N.Y.

[21] Appl. No.: 278,196

[22] Filed: Jul. 21, 1994

[51] Int. Cl.$^6$ ............................................. G06F 11/00
[52] U.S. Cl. .................... 395/575; 395/425; 364/268; 364/268.5; 364/285.1
[58] Field of Search ............... 395/575, 425; 364/268, 364/268.5, 285.1, 285; 371/10.1, 10.2

[56] References Cited

U.S. PATENT DOCUMENTS

| | | |
|---|---|---|
| 4,432,057 | 2/1984 | Daniell et al. . |
| 4,459,658 | 7/1984 | Gabbe et al. . |
| 4,654,819 | 3/1987 | Stiffler et al. . |
| 4,665,520 | 5/1987 | Strom et al. . |
| 4,686,620 | 8/1987 | Ng . |
| 4,819,156 | 4/1989 | DeLorme et al. . |
| 4,819,159 | 4/1989 | Shipley et al. . |
| 4,868,744 | 9/1989 | Reinsch et al. . |
| 5,043,866 | 8/1991 | Myre, Jr. et al. . |
| 5,043,871 | 8/1991 | Nighigaki et al. . |
| 5,072,368 | 12/1991 | Foreman et al. . |

Primary Examiner—Vincent P. Canney
Attorney, Agent, or Firm—Robert M. Carwell

[57] ABSTRACT

A computerized data backup system and method for dynamically preserving a consistent state of primary data stored in a logical volume of a disk volume management system during processing thereof in a real-time environment. A file system command invokes a cloning of the logical volume, thereby reserving a portion for shadow-paged blocks. A read/write translation map is generated, mapping non-shadowed pages to corresponding shadowed pages in the reserved portion. Upon generating a read command for a page in the logical volume, a map search detects that a shadow page is allocated in the shadow-paged blocks corresponding to the page and effects the read. In like manner, in response to a write command to a page of the logical volume, the map is searched and a shadow page in the shadow-paged blocks is allocated if there has been no prior allocation, whereupon writing to such allocated page occurs. The backup occurs during runtime, facilitating reading from the non-shadow paged blocks during backup.

20 Claims, 8 Drawing Sheets

COMPUTERIZED SYSTEM AND METHOD FOR DATA BACKUP

FIELD OF THE INVENTION

This invention relates to systems and methods for backing up data in computer systems and, more particularly, to providing copies of computer file systems during system operation.

BACKGROUND OF THE INVENTION

In most computer systems there is a need to provide for backing up of data. The most common reason, of course, is for security purposes in order to deal with power outages, software malfunctions, or other situations which would otherwise result in irretrievable corruption or loss of valuable data. The need is particularly acute, for example, in transaction based systems such as those typically found in banking, insurance, airline operations, or the like. In such systems, a further typical requirement is that they be in continuous operation whereby transactions may not easily be halted in order to provide for such data backup. Provisions must therefore be made for dynamically backing up the data "on the fly" e.g. during the routine transactional operations being performed by the system, whether they be booking of airline ticket reservations, posting banking transactions or the like.

It may be readily appreciated that several serious constraints are imposed on the ability to provide for data redundancy in computer systems, such as the aforementioned inability to cease operations even for relative short periods to provide for backup. Yet an additional requirement for backups is a necessity to maintain the particular file system's data arrangement after backup. Thus, in providing for such security another serious constraint which has been imposed is that the existing file system must remain intact, necessitating at most only minimal changes to the file system layout itself.

Yet another problem presented by modern computer systems, particularly those of the transactional variety, relates to the paramount requirement that the database and file system always remain in a consistent state at any time, thereby compounding the problems in providing effective data backup. The classical illustration of the problem is that airline transactions must always maintain their atomicity, with both sides of the ledger committing at the same time. For example, when a reservation is made on an airline, the reservation system ever cannot be an inconsistent state wherein the customer has been guaranteed a ticket yet the database has not been debited by one seat to reflect the resulting unavailability of a seat for another passenger.

In like manner, in the banking industry, the situation must be precluded wherein the customer is granted use of a sum of money (e.g. a credit) without simultaneously a debit being reflected in his or her account balance. An associated problem in provision for backup systems is that the systems typically include transactional logs, for such security and database consistency, which must at all times remain in sync, even during any backup procedures such that the aforementioned consistent state of the database is always maintained and presented to the user.

Several attempts have been made in the prior art to effect a commercially acceptable system for data backup which nevertheless suffer from serious drawbacks. One approach has been to provide for a form of periodic backup of prior systems which unfortunately involves simply stopping the processing while performing backup. For reasons detailed above this solution obviously was easily found to be completely unworkable, inasmuch as modern businesses simply cannot afford downtime (even on off hours) to perform system maintenance and related backup. Other systems have attempted to circumvent this problem by providing backup "on the fly". However, they have also necessitated the unfortunate requirement that the prior system's file system per se be altered necessitating increased cost and risk which has also been found unacceptable.

Still a further attempt to solve the problem has been to effect a "mirroring" technique now well known in the art which involves the creation of a redundant copy of data which is in fact available essentially at all times. However, several notorious drawbacks have been associated with this approach. First, it requires a redundant copy of all data. Given the immense cost associated with storage devices such as DASD and the like, this drawback alone renders a mirroring approach in many if not most applications as very undesirable.

In summary then, with respect to prior art, one technique was simply to cease processing while backing up which had its obvious drawbacks. The other technique, in more detail, involved saving a partition map, breaking off a mirrored copy of the logical volume to create a new logical volume and backing up. When writing to the logical volume, the write operation also would then include a write to the mirrored copy of the logical volume. This latter technique accordingly involved the drawback of performance penalties in the additional write time and cost penalties in paying for twice the DASD].

Yet another reason for disfavor of the mirroring approach in addition to extra DASD is that, in providing for such redundant copying of all data, severe performance penalties are incurred as noted which are found to be completely unacceptable in many commercial environments. The all-too-familiar delays in an airline ticket line awaiting completion of a transaction by a host computer underscores the inadequacy of any proposed solution to the problem which adversely impacts the computer system's performance.

For all the foregoing reasons, a simple and effective system was highly desired in the industry which could provide for data backup in computer systems. It is thus an object of the invention to provide for such a system.

Yet an additional object of the invention was to provide for data backup systems operating under the covers to permit a perceived normal operation of database transactions while at the same time providing for such backup.

Yet a further object of the invention was to provide an effective system which could freeze a copy of data readable at any time while presenting a normal view of such data during system backup.

Still a further object of the invention was to facilitate a mechanism whereby an "uncloning" of the backup procedure could be effected in a seamless manner without disruption of ongoing file management.

Yet a further object of the invention was to provide for a practical data backup system which avoided the necessity for mirroring and associated performance problems and increased memory costs.

Another object of the invention was to provide for a data backup system which did not entail alteration of the underlying file system data arrangement.

These and other objects are achieved by the invention, a more detailed understanding of which may be obtained with reference to the following drawings wherein:

SUMMARY OF THE INVENTION

A computerized data backup system and method for dynamically preserving a consistent state of primary data stored in a logical volume of a disk volume management system during processing thereof in a real-time environment. A file system command invokes a cloning of the logical volume, thereby reserving a portion for shadow-paged blocks. A read/write translation map is generated, mapping non-shadowed pages to corresponding shadowed pages in the reserved portion. Upon generating a read command for a page in the logical volume, a map search detects that a shadow page is allocated in the shadow-paged blocks corresponding to the page and effects the read. In like manner, in response to a write command to a page of the logical volume, the map is searched and a shadow page in the shadow-paged blocks is allocated if there has been no prior allocation, whereupon writing to such allocated page occurs. The backup occurs during runtime, facilitating reading from the non-shadow paged blocks during backup.

DETAILED DESCRIPTION OF THE PREFERRED EMBODIMENT

Figure 1:
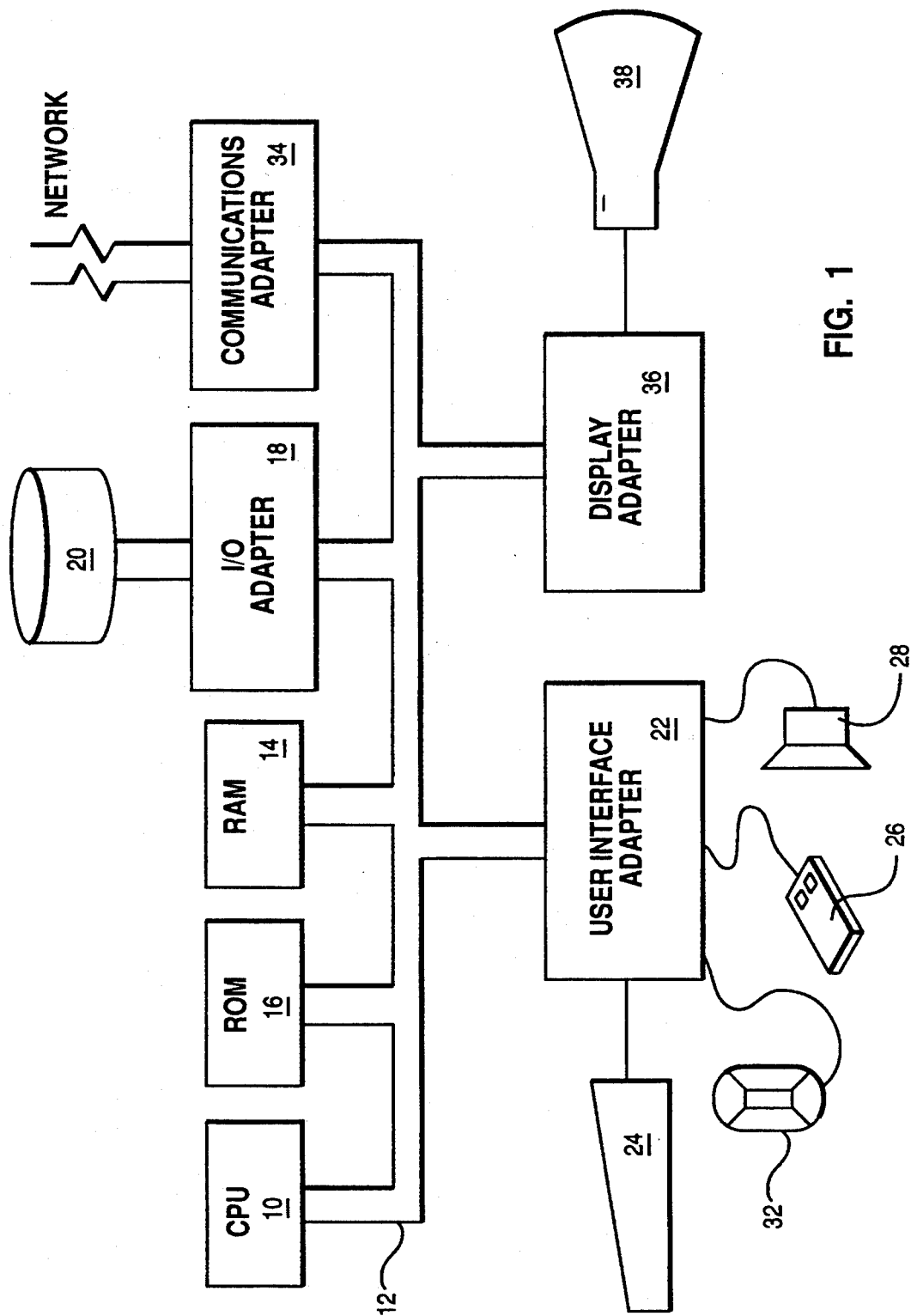
FIG. 1 is a functional block diagram of a computer system employing the program described herein with particular reference to FIGS. 4 and 5.

First an overall description of a representative computer system employing the invention will be provided with reference to FIG. 1. This will be followed by a description of the logical volume system and logical volume manager employed in the system of FIG. 1 with particular reference to FIGS. 2 and 3. This in turn will be followed by more detailed description of the components of the invention and their operation with reference to FIGS. 4 and 5.

Figure 4:
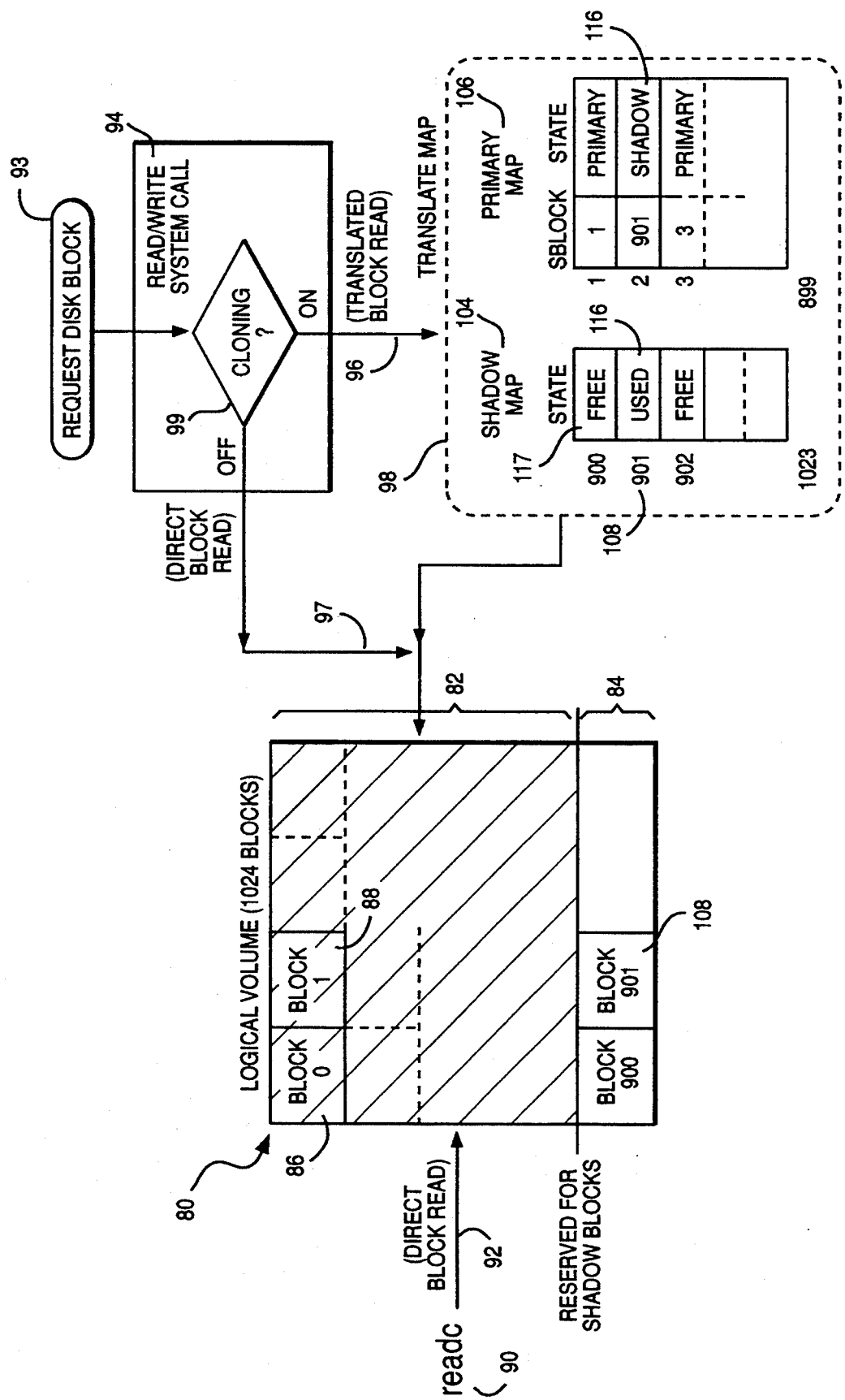
FIG. 4 is a block diagram illustrating the memory structure of the invention and process flow.
Figure 5:
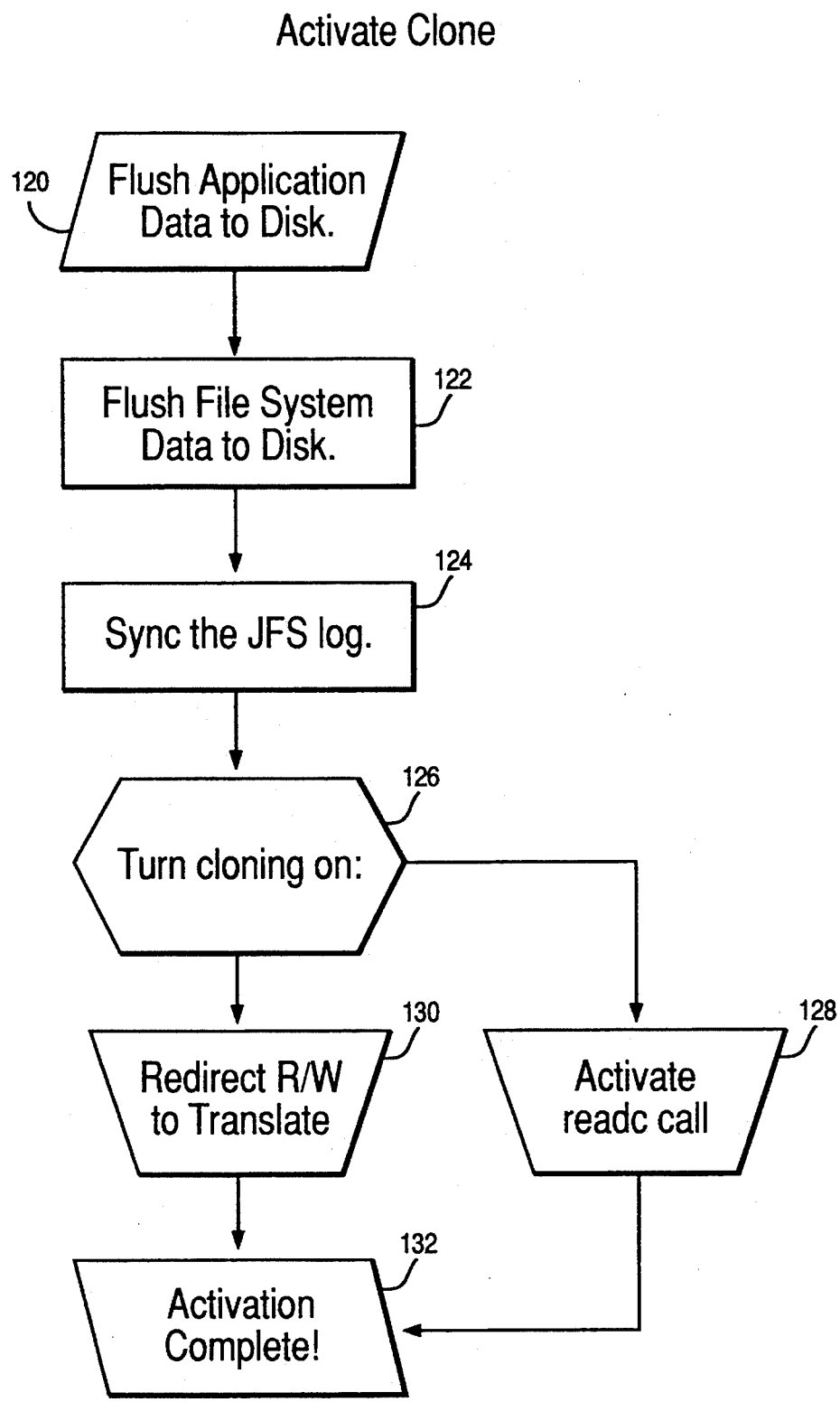
FIG. 5 is a flow diagram illustrating the sequence for activating a clone state.

Turning now to FIG. 1 illustrated therein is a preferred embodiment of a computerized data processing system operating in conjunction with the program illustrated in FIGS. 4 and 5 for performing the herein described operations of the invention. The system comprises a CPU 10, read only memory (ROM) 16, random access memory (RAM) 14, I/O adapter 18, user interface adapter 22, communications adapter 34, and display adapter 36, all interconnected via a common address/data/and control path or bus 12. Each of the above components accesses the common bus utilizing conventional techniques known to those of ordinary skill in the art, and includes such methods as dedicating particular address ranges to each component in the system, with the CPU being the busmaster. Other conventional techniques known to those of ordinary skill in the art employed in the system of FIG. 1 include direct memory access (DMA) used to transfer data at high speed from external devices such as DASD 20 or the network shown to the data processing system's RAM 14.

As is further shown in FIG. 1, these external devices such as DASD 20 interface to the common bus 12 through respective adapters such as I/O adapter 18. Other external devices, such as the display 38 similarly use their respective adapters such as a display adapter 36 to provide data flow between the bus 12 and the display 38 or other device. Various user interface means are provided for interconnection and use with the user interface adapter 22 which, in the figure, has attached thereto representative user input devices such as a joy stick 32, mouse, 26 keyboard 24, and speaker 28. Each of these units is well known as such and accordingly will not be described in detail herein.

As will hereinafter detailed, upon implementation of an appropriate program such as that described herein with reference to FIGS. 4 and 5, the system of FIG. 1 will execute the program in order to effect the desired automated data backup in accordance with the invention on a storage device such as a DASD 20.

In the preferred embodiment, the computer system of FIG. 1 will be operating under control of an operating system such as the UNIX (Trademark of UNIX System Laboratories, Inc.) operating system. One function of such operating systems is to logically subdivide the storage 20 into file systems comprising smaller storage disks. Such systems, in a conventional manner, are employed to store data files, executable programs, and the like. One characteristic of such systems is that it is often difficult to increase the size of such file systems after the system is in use and need for increased size becomes apparent. Yet an additional limitation associated with most computer systems employing the UNIX operating system is that the file systems employed typically may not span more than one physical disk drive, e.g. the file system size was conventionally limited to that of the particular storage or disk drive such as DASD, thereby preventing utilization of additional disk storage.

In addressing the hereinbefore noted inadequacies of file systems in their inability to be increased in size or to span multiple physical disk drives, the concept of a logical volume manager (LVM) was provided, notably in the AIX (Trademark of IBM Corporation) operating system for RS/6000 (Trademark IBM Corporation) computer systems. The function of the LVM was conceptually to organize or partition into equal-sized physical partitions a plurality of physical disk drives, this collection of physical partitions, conceptually being equivalent to a file system, being referred to as a logical volume or LV. In this manner, a logical volume may include such physical partitions from multiple different disk units in the system of FIG. 1 and, accordingly, such logical volume may be larger than any individual disk unit. Moreover, in addressing the prior problem of a fixed file system size, in such an LVM approach, additional physical partitions may be added as required to the logical volume without disrupting operation or requiring alteration of other partitions.

As previously described, one approach in the prior art providing for data recovery is for the LVM to provide a mirroring function. (In passing, for sake of completeness, it will be noted that some vendors provide for "freeze" mirrors for data backup purposes, although the system is thus left vulnerable in the event recovery is necessary). In such a system multiple copies of the logical volume (e.g. a "mirror") are automatically maintained by the system in storage 20. Accordingly, other physical partitions are allocated on different physical disks to hold identical copies of the data associated with a particular physical partition. Accordingly, in operation of the LVM, data will automatically be read from one of the mirrored physical partitions and new data written to a new area of disk if a disk error occurs while reading a mirrored logical volume. In this manner, a system employing the LVM with the hereinbefore described mirroring function permits recovery from such disk errors without disrupting normal system operation. This thereby effects a highly desired characteristic of high availability in provision for redundancy for automatic error-recovery. However, as also previously described, a serious drawback to this approach giving rise to the subject invention is that more disk space is required when employing this mirroring capability inasmuch as multiple copies of information in the disk system are being retained.

Figure 2:
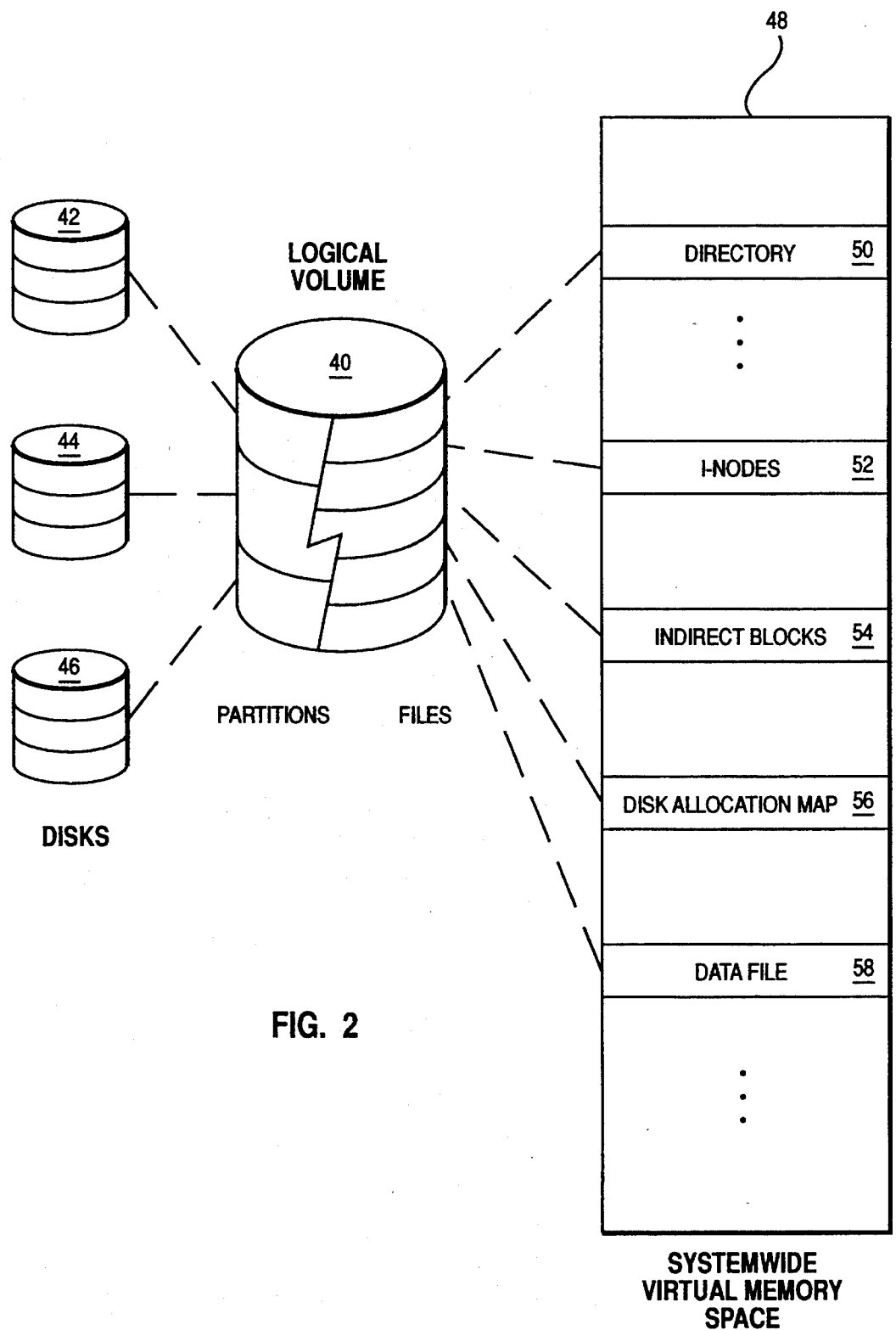
FIG. 2 is a illustration of a file system in a logical volume in virtual memory as employed in the system.

Referring to FIG. 2, an illustration is provided of such a logical volume as employed in the invention. More detailed information regarding the structure and operation of such memory will be found in "IBM RISC/6000 Technology", first edition 1990, copyright IBM Corporation, with particular reference to pages 138–141 and 144–149, incorporated herein by reference.

In the preferred embodiment employing a version of the UNIX Operating System, a file in such a system is an unstructured byte string stored in a set of not necessarily adjacent disk blocks. File system meta-data (I-nodes, indirect blocks, and directories) are used to find and access files. An I-node, 52, is a small block that contains information such as file owner, access permissions, file size and the locations of a few data blocks for a small file. Larger files have a tree of indirect blocks, 54, rooted in the I-node, which contain the data block locations. A directory, 50 is a file which contains pairs of the form (Filename, I-node location) organized for searching by file name. Directories may contain names of other directories, thereby forming an hierarchy or tree. A file is named by a variable-length sequence of names that gives a directory search path, starting from the root directory, to the location of the file I-node. The logical volume 40 will further obviously include various data files 58 and a Disc Allocation Map 56, such directories, I-nodes, etc., collectively forming the system-wide virtual memory space 48. As was hereinbefore detailed, typically in most UNIX operating system implementations provide for separating the total physical disk space into partitions such as one disk or a contiguous portion of one disk (sometimes referred to as a minidisk). Each partition contains a file system within its own directory tree I-nodes, indirect blocks, and files. These separate file systems are formed into a single tree by making the root directory of each file system, except one, become a directory in the tree of another file system.

Modern versions of the UNIX Operating System, such as the AIX Version 3 System retain the foregoing model but generalize the concept of disk space as previously mentioned into the system shown in FIG. 2. Each file system thus occupies a different logical volume 40 of disk space contained in the physical storage 20 of FIG. 1 composed of one or more disk partitions rather than one disk partition as in the prior art. A partition is contiguous on one physical disk, but, as previously noted, a logical volume 40 may have partitions on more than one disk in a group of related disks as shown in FIG. 2. All partitions in the disk group are of one size but logical volumes may differ in the number of partitions they have. Each disk contains a description of the group it is a part of, for example, what logical volumes are in the group and what partitions belong to each volume.

This generalization of disk space as shown in FIG. 2 provides for the hereinbefore noted two important benefits. First, the space available to a file system may thereby be expanded by adding a partition to the logical volume without stopping the system or moving any other partition. If necessary, a disk may be added to the group to supply more free partitions. In FIG. 2 multiple physical disks 42–46 are shown to illustrate that the logical volume 40 may span multiple physical disks and that additional such physical disks may be added to the system.

The second benefit to this disk space generalization previously noted was that a logical volume may be mirrored to enhance data availability. Each partition of such a volume has one or two other partitions allocated on different disks to hold identical copies of the data.

The file systems and virtual memory pager do not use the physical disks directly, but rather instead consider each logical volume as a device and call a corresponding logical volume device driver. This component translates a logical volume disk block location into a physical block location or mirrored locations. When mirroring, the driver reads the fastest copy or writes all copies identically. If a permanent disk error occurs, the driver may then simply assign a new location for the block and, if mirrored, read a good copy and write the data into the new location.

File buffering is simplified in the preferred embodiment by not using the kernel buffer cache. Files are always mapped into virtual memory segments when first opened, and there is a separate virtual memory segment for the different meta-data of each file system, that is, one for I-nodes 52, one for indirect blocks 54, one for disk block allocation map, 56, and one for each directory 50, as shown in FIG. 2. The kernel addresses these segments by loading their segment IDs as needed. For example, during read and write system calls, the kernel loads the file segment ID to move data between the file and the caller's area. Files and other virtual memory share the common pool of all real memory.

Mapping of files into virtual memory segments is thereby simplified in accordance with the previously described system. Rather than copying disk block locations from the file system into external page tables for virtual memory, the system simply makes the file system meta-data (I-nodes 52 and indirect blocks 54) available to the virtual memory pager. The page fault handler accesses the file meta-data directly to find a disk block location needed for page-in or to save a newly allocated disk block location for eventual page-out.

Figure 3:
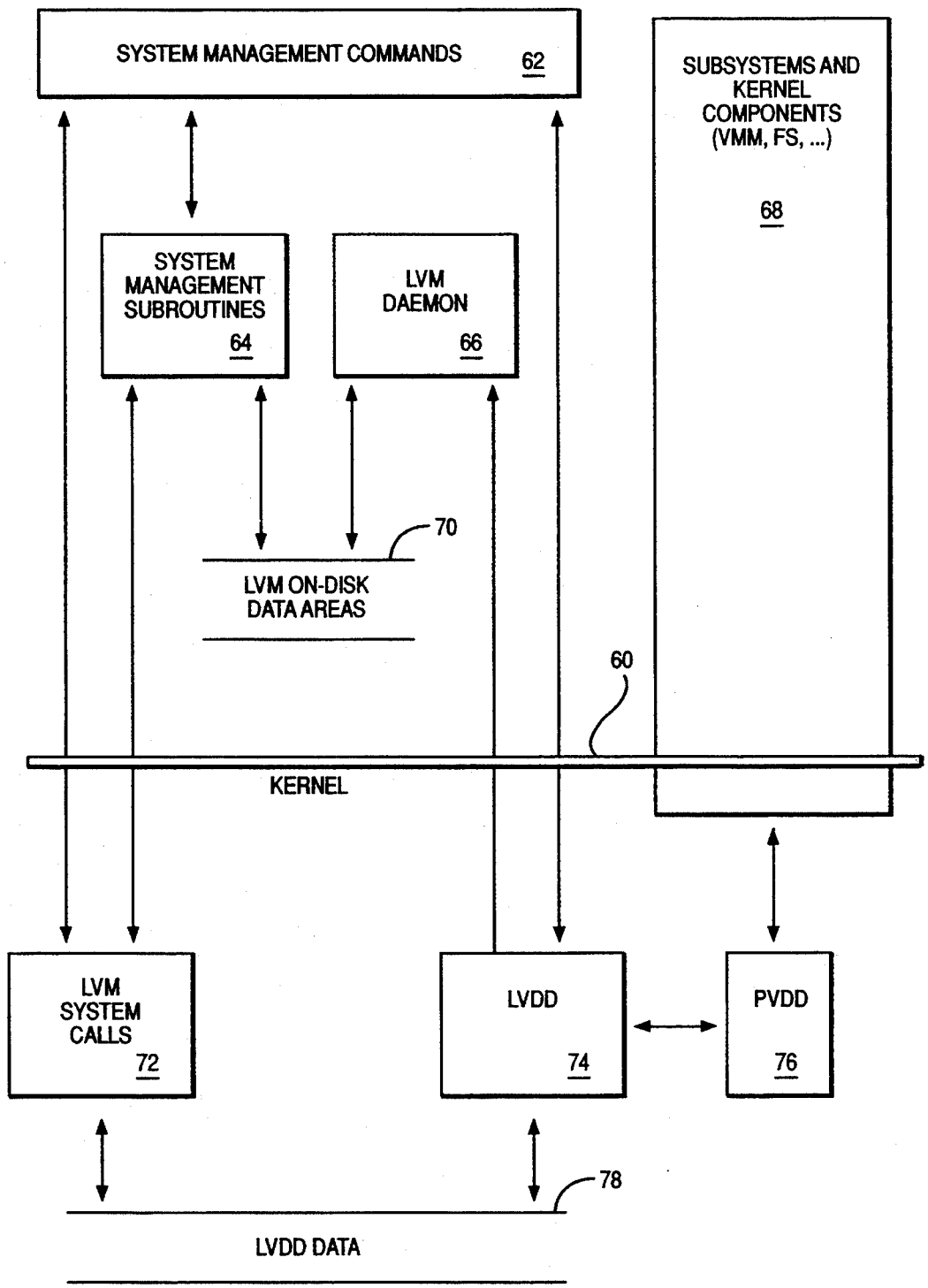
FIG. 3 is a block diagram illustrating the structure of a logical volume manager utilized in the invention with respect to FIGS. 1, 4 and 5.

Turning now to FIG. 3, a more detailed block diagram is provided therein of auxiliary storage management as may be employed in the system of FIG. 1. The logical volume manager (LVM) depicted therein contains a layer of device driver code in the kernel shown below line 60 which is above traditional UNIX disk device drivers. This allows file systems to be dynamically resized and relocated, span multiple physical volumes, and have their contents replicated for greater availability. The LVM also provides bad block relocation, and a vehicle for accessing the special features becoming available in disk subsystems.

The LVM manages collections of read-write physical disks previously described as physical volumes or PVs. One or more physical volumes are administratively lumped together into entities called volume groups (VGs). Within each volume group, all the constituent physical volumes are logically subdivided into a number of equal-sized contiguous units of space, e.g. the physical partitions (PPs). A logical volume (LV) is thus a collection of physical partitions that provide the abstraction of an extensible, reliable disk volume. Replication may be used to improve availability of logical volumes as aforementioned by maintaining copies of a physical partition (e.g. the mirrors). The set of PPs, which are mirrors to each other, is called a logical partition (LP).

Additional definitions are helpful in an understanding of storage management utilized in the invention. A physical volume (PV) is another way to name a read-write fixed disk physically attached to a computer (as opposed to diskettes, CD-ROMs and network-attached devices). A volume group (VG) is a collection of PVs exclusively owned by a respective single VG, although they need not be of the same type or size. A physical partition (PP) is the smallest unit of disk space allocation, and is a contiguous space on a PV. The size of a PP is the same on all PVs in the VG, and that size is determined when the VG is created (typically varying as a power of two between 128K bytes and 256M bytes). A logical partition (LP) is a set of three PPs, with PPs after the first one containing redundant copies of the information owned by the respective LP. Each constituent PP in an LP is in one of two states—either valid (meaning it has a valid copy of the data for this LP) or stale (meaning that the data on this PP cannot be used). The process of changing the state of a PP from stale to valid is called mirrored synchronization. A logical volume (LV) is a collection of PPs organized into LPs, contained in a single VG. There is no requirement that the constituent PPs of an LV be contiguous or that they be contained on the same PV. The size of the LV and the location of the PPs that make up the LV may be changed while the system is running. The initial allocation of PPs to an LV is a policy decision made at a high level in the system management hierarchy reflected by the system management commands 62 and system management subroutines 64.

Bad block relocation is the process of redirecting read-write requests from a disk block that can no longer retain data to one that can. The process is transparent in the sense that the application is not aware that requests directed to a physical block are actually serviced by a different block. The LVM depicted in FIG. 3 will generally provide this service in its device driver (LVDD) 74, in response to appropriate LVDD data 78. Intelligent disk subsystems are available which are capable of providing bad block relocation entirely within the subsystem. The LVM will take advantage of these devices and not perform the relocation in the device driver. This is an example of the LVM presenting an interface to applications by using advanced features of the disk subsystem, when available, or by emulating these features in software when they are not provided by the hardware.

Continuing with an explanation of the architectural overview of the LVM with reference to FIG. 3, as previously noted the LVM provides a disk device abstraction built upon normal device drivers such as those found in the UNIX Operating System. Communication with the LVM is through a library of subroutines 64 and through standard device operations to the LVM device driver 74.

The LVM is made up of three major pieces, the previously noted logical volume device driver (LVDD) 74, an LVM daemon 66, and the LVM subroutine interface library 64, also previously noted. The LVDD is a pseudo device driver which manages access to logical volumes. The LVDD provides the same character and block entry points as a physical disk device driver 76, which interfaces to subsystems and kernel components 68 (such as a virtual memory manager, file system, and the like).

The LVM daemon, 66, provides services to the LVDD 74, and the system management subroutines 64 through the LVM on-disk areas 70. These services include updating the on-disk LVM data areas 70 and forwarding error information to the system error daemon. The LVM subroutine interface library 74 contains routines that facilitate communication between system management applications and the LVDD 74 by means of the system management commands 62.

System management for the LVM makes a distinction between setting policy and its implementation. The interface is presented by the LVDD 74 and the system management subroutines 64 are flexible enough to allow implementation of almost any policy. Policy decisions are made in user-level code and presented to the LVM for enactment through these interfaces. For example, a user-level command may be provided to extend an LV. This command must select the exact PPs to be added to the LV being extended. The command will examine the current location of the PPs in the LV, the existing mirroring scheme for the LV, the system defaults, and many other factors, to select the PPs that should be added. Once the PPs have been selected, the command will call the LVM system management subroutines to incorporate the PPs into the LV. In such an example, the PP selection process is statement of policy for this system, and the system management subroutines are the instruments used to implement such policy.

It may thus be seen from the foregoing that the LVM significantly increases flexibility of auxiliary storage management. Placement of the LVM in a layer above normal UNIX device drivers allows applications to choose between increased function provided by the LVM or greater performance possible by using the disk device driver. By preserving the standard UNIX Operating System device driver interfaces, the LVM allows existing code to benefit immediately from the new function provided by the LVM. Moreover, as auxiliary storage devices continue to evolve, the LVM is thus structured to be able to take advantage of new function provided in hardware to reduce the processor overhead required to maintain the interface presented to applications.

Now that a more detailed description of the logical volume manager has been provided, a discussion of its use in cloning a logical volume in accordance with the invention will be provided. It will be recalled that in transactional computing, for example, all database logs must be in sync, and one of the problems addressed by the invention is how to provide for a backup of a logical volume while the system continues to run. In other words, it is simply not feasible to shut down system operations in order to provide such a backup.

Thus referring now to FIG. 4, a clonable logical volume (LV) 80, is shown therein. In the embodiment being described, such an LV would be comprised, for example, of a 4 megabyte portion of memory comprised of 1024 block of 4K bytes. Representative such blocks such as blocks 0, 1, and 901 are shown at respective reference numerals 86, 88, and 108.

The logical volume is divided into a non-shadowed portion consisting of 900 4K blocks (reference numeral 82, shown in cross-hatching), and a portion of the CLV reserved for shadow paging of shadow-paged blocks (shown at reference numeral 84). This latter shadowed portion of the CLV will comprise the balance of the 4 megabyte volume and, in the embodiment depicted, will in turn be comprised of 124 4K blocks. This shadowed portion, 84, thus nominally comprises ten percent of the volume reserved for shadow paging. The particular percentage may vary dependent upon factors such as the backup rate and writing activity and thus may exceed ten percent.

A very brief description of the overall operation of the system will be provided with reference to FIG. 4 in order to illustrate generally how the clonable logical volume system works, followed by more detailed description. Upon entering the clone logical volume mode, it will be noted that a READC function 90 is available. This call will return regular blocks of data such as block 1 at reference numeral 88 shown by the arrow 92. This function call, which heretofore was dormant, is instantiated upon entry of the clone mode and permits accesses to the primary memory (e.g. the 900 non-shadowed blocks 82). It thereby permits a view of data as if the data had never changed and involves no translation.

In contrast, a READ or WRITE system function call 94 is further provided upon occurrence of a Disk Block Request 93. A return provided by the READ function when cloning is on shadowed data such as a shadowed version of the aforementioned block to data shown at reference numeral 88. The key factor associated with such READ is that instead of returning a normal read of the block to data, such a normal read (or write for that matter) will now be directed as shown by arrow 96 to a read/write translation map 98 when cloning is on. In other words, it will be appreciated that the cloning operation will now create an alternate read/write path. In response to the read/write system call 94, the system implementation provides for a determination whether cloning is on or not, shown by decision block 99. If it is off, a direct block read will occur shown by arrow 97 to the corresponding appropriate block in the non-shadowed portion 82 of the logical volume 80. On the other hand, if the cloning function determined by block 99 is on, a translation block read will occur as shown by arrow 96.

The overall purpose of the translation map 98 is to determine (upon occurrence of the read command for a given block when cloning is on), that the block has been shadowed and, in turn, to determine which of the shadowed blocks 900–1023 (reference numeral 84) contains the data originally appearing in the corresponding non-shadowed block. This functionally is provided by employing the shadow map 104 and primary disk map 106 included in translation map 98 to be hereinafter described. It will be noted that the non-shadowed blocks are not changed from their prior state and it is the shadowed blocks which receive the new data.

In summary, after the cloning operation has been activated, access to the cloned logical volume for normal read/writes will be through a read/write system function call 94 whereby such normal read/writes will pass through the read/write translation map 98 when a disk block request 93 is obtained. The shadow map 104 correlates the shadow blocks such as block 901 (reference numeral 108) to its state 116. If a block such as block 901 has not been redirected through the read/write translation map 98, this state of course will be indicated in the shadow map as normal or "primary" (e.g. not shadowed). The primary map 106 correlates the old (e.g. pre-shadowed) block numbers to the shadowed blocks, e.g. it indicates whether a block has been shadowed or is primary. If a block such as block 2 has been shadowed or copied into block 901, for example (shown at reference numeral 116 of primary map 106), a clone "on" condition 99 will cause a READ 94 to traverse through the path shown by reference numeral 96, 98, to the primary map 106. In looking up in the array the block number 2 the primary map 106 will indicate a shadowed state (shown at reference numeral 112) and the shadow block number (901) where the correlative data in the shadowed memory 108 occurs. In other words, the primary map will indicate that the shadowing of old block 2 occurs in block 901. This pointer to shadow block 901 in the array of the disk map 106 will then be used in the shadow map 104 to determine the state of block 901 (shown at reference numeral 108) by looking up in the array of the shadow map 104 the shadow block number 901.

It should be apparent that initially the old block numbers prior to any shadowing will map to themselves, e.g. in the box 98 the primary map 106 and shadow map 104 will reflect that block 1 data is mapped to or located in block 1, block 2 is located in the memory associated with block 2, and so forth, e.g. there is no redirection from, for example, block 2 to its shadowed corresponding block 901 as shown in FIG. 4. Shadow blocks are thus not mapped until demanded by a write operation, and there is no inherent correlation between, e.g. block 1 and block 901, as block 25 could be mapped to block 901.

An example of a write process will serve to further illustrate operation of the invention. It may be assumed that it is desired to write to block 1, in which case the write function call will be routed through path 96 to the translation map function 98 (assuming the cloning is on). In looking up this old block 1 (reference numeral 88), if it has not previously been mapped, its state will therefore be "not mapped" (e.g. "primary") and a "1" referring to the unshadowed original block 1 will be returned to the translation map 98. An "allocate" function will then be called and used to shadow map block 1 to an available block in the shadowed memory 84 such as block 900 (shown as "free" in a state, 117). Once a block such as block 900 has thereafter been allocated and shadowed, the state 117 corresponding to the shadow block 901 (reference numeral 108) will therefore be changed to now show that the state of that particular shadowed block is now "used". During this "allocate" function, the system copies the data in block 1 to the correlative shadowed block such as block 900. In other words, the write flow upon the system receiving a write request is to first check the block state in the primary disk map 106. If the block is not mapped or shadowed (e.g. shown as "primary"), the "allocate block" function is called. The data in the block number to which the write request was made is then copied to an allocated block such as block 900, which is free. A return is then made of this shadowed block number and thereafter the write will be to the block 900 rather than the requested write to block 2. The benefit to such an approach is that the copying of the block 1 data to block 900 essentially occurs "under the covers", e.g. a write proceeds as a normal operation and only requires a minimal alteration in the file system. Moreover, during the cloning process no change of the primary partition is required.

After such a write process, when the logical volume has been cloned and a read is required, the read path will be followed from the read function call 94 through arrow 96 and to the translation map 98. During a read, for example, of block 2, the translation map will point to an entry in the shadow map 104 which indicates that block 2 has thus been shadowed to block 901, whereupon a 901, indicating to the system where the data may be read.

Upon an orderly completion of a clone and associated reads and writes, it will be appreciated that an "uncloning" operation may be effected. In such an operation, the shadow pages will be collected, the tables locked, and the shadow blocks such as 901 copied back to their respective original blocks such as block 2. The previously discussed maps at the appropriate places will thereafter be altered to reflect that these uncloned blocks are no longer mapped, thereby effecting a desired atomic switch from the cloned to the uncloned state. Thus if the system malfunctions in the middle of operations, it may be switched out of the clone mode, thereby uncloning and moving shadowed data into the regular blocks. After the uncloning wherein the data is copied back (such as the copying from block 901 to block 2) and after the change of state is thereby effected in the maps accomplishing the atomic switch, it will be appreciated that subsequent read/writes until a next cloning operation will traverse through the normal read/write paths and not to the translation map 98 when there is thus no shadowing of the subsequent blocks which are written to or read from.

In the following a more detailed description of the various specific functions will be provided in order to effect the system herein described. Several assumptions are made in implementation of the system. First, that the clone operation itself is one which persists for a relatively short period of time. In such time, an LV is thus designated as being in the "clone" state, and the "clone" reads or writes are effected to the CLV, whereupon the state is returned to the non-cloned state. A further assumption is that a single LV may maintain only one clone state at a time, e.g. a clone may not be started and then another clone operation started before terminating the prior cloned state. Thirdly, it is presumed that the clone operation is on a single LV, meaning that the smallest clonable unit in the implementation described is the LV.

The basic concept of the invention, as noted, is that the LVM will reserve some portion of a clonable LV to contain shadow-paged blocks. Thus, in the embodiment described, after creating a 4 megabyte clonable logical volume, the file system will perceive 900 4K blocks, with the LVM reserving the remaining 124 4K blocks for shadow paging (the 4K block size is utilized in the example although the precise size is determined by what is allocated by the file system which may alternatively, be 512 byte blocks, for example).

The thus-created 900 block LV would function effectively like a normal LV until the clone operation is requested. However, once the file system has instructed the LVM to clone the LV, several changes already touched upon transpire.

First, the READC command is now available, e.g. READX( ), READ commands, read from the shadow pages 84 of FIG. 4 if they exist by means of a READ( ) call. Still further, WRITE commands, effected by the WRITE( ) call, either write to a previously allocated shadow page or allocate a shadow page if one does not already exist and write to it. Finally, an unclone command is made available to reverse the cloning state.

The file system will support clone-related virtual node operations (VNOPS) although most of this function will be passed through to the LVM. The system admits to inclusion of various file systems, whether it be a journaled file system (JFS), DOS file system, Berkeley file system (BFS) or the like. All such file systems will have provided a virtual node (VNODE) layer and will attach to this virtual system layer such that virtual node operations such as data translation and the like will all look the same to the operating system. Most change associated with the journaled file system (JFS) is in support of the clone operation. Before the JFS instructs the LVM to enter the clone mode on an LV, the JFS will preferably run out the log and ensure that all data and meta-data is committed to disk, deferring file system operations until a return from the LVM. Although in a properly designed system the LVM will return quickly, this may be perceived by a user as a short pause while the log is run out and the data pages are written.

With respect to existing LVMs, in accordance with the invention, some new entry points will be provided and some of the existing functions of prior art LVMs will be changed although it is a feature of the invention that significant reconfiguring is not required.

Specifically, the following new commands will accordingly be provided:

CLONE(lv)—This command will instruct the LVM to initiate a clone mode on an LV. It will succeed only if several conditions are met, namely that the caller possesses the right level of privilege, the LV is currently available, the LV was created as a clonable LV, and it is not currently in a clone mode.

READC(lv,block)—This command will read a block of data from the logical volume. It is only valid when the LV is in a clone mode. The block returned will always come from the primary (e.g. non-reserved) portion of the LV shown at reference numeral 82 in FIG. 4. The backup command and the "clone a file system" copy command will employ this special call (indirectly through the clone VNOPS exported by the JFS) to obtain the original data on the disk. This is the data which contains a consistent "snapshot" view of the file system.

UNCLONE(lv)—This command will instruct the LVM to terminate the clone mode for a given LV.

As with the clone command, it will be effective only if certain conditions are met, namely that the caller has the correct privilege level, the LV is currently available and the LV is currently in the clone mode. The LVM will perform some processing in support of this UNCLONE command. First, as briefly touched upon hereinbefore, it will cause copying of the cloned blocks 84 in FIG. 4 to their original positions in the non-reserved portion of the CLV 80 shown by the crosshatched portion of the LV 80 at reference numeral 82 in FIG. 4. In order to provide minimum impact upon on-going LV operations, in a preferred embodiment this copying activity may occur in the background and will float a "high water mark" through the shadowed pages in a manner known in the art. This effectively means that writes to non-shadowed pages will occur through their correct location in the non-reserved portion 82 of the CLV.

As a shadowed page is copied to its correct location in the unclone operation, that block mapping translation is deactivated and the block joins the group of non-shadowed blocks. Writes to the block in flight will be delayed until the block copy completes. Writes to shadowed blocks still in the reserved area will be written to the reserved blocks. There will further be a journaling of shadow blocks written back to their correct locations, such that if the system of FIG. 1 malfunctions, it will be possible to complete the unshadow operation as part of VARYONVG processing, described later.

As previously described, additional LVM commands and/or functions already present will preferably be modified in support of the new clone function as follows:

READ(lv,block)—The "read block" command will be modified to behave differently if the LV is currently in the cloned mode or state. If the LV mode is in fact "clone", and the block number has a shadowed version, the read command will return that shadowed data instead of the regular data. READC will, of course, return the regular non-shadowed data, 82.

WRITE(lv,block)—The "write block" command will preferably be modified to behave differently, dependent upon whether the LV is currently in a cloned mode. If the LV mode is "clone", the writes to blocks not yet shadowed will allocate a shadow block (from the reserved part of the LV, 84,) will thereafter create a shadow block translation entry for that block, and write the block to the newly-allocated shadow block location. Writes to blocks that already have a shadow block translation entry will just write to the shadowed location.

One potential problem may occur if there are no more shadow blocks available in the reserved section 84 of the LV when the WRITE command requires one. One approach to successfully addressing this is that the LVM will delay all further file system writes until the CLONE operation has completed and the UNCLONE command is issued. It is preferred however that in a given implementation this be avoided.

VARYONVG—This command will initiate shadow block cleanup in addition to mirror resynchronization.

VARYOFFVG—This command will await outstanding clone activity before completing. The file system "unmount" command will fail if an LV is in the "clone" state.

EXTENDLV & REDUCELV—These commands will preferably be activated if the LV is currently in the "clone" state whereby no extra copying would be required. Otherwise, an additional level of redirection would be required.

CREATELV—This command will include an additional parameter which will indicate to the function that the LV is in a clonable state and therefore space is reserved.

CHANGELV—This command may be modified to permit changing a clonable LV into a non-clonable LV, thereby allowing a system administrator to recapture the space otherwise allocated to the cloning function.

It will be apparent that the file system will preferably also support additional function to effectively make use of the clone feature in accordance with the invention. For example, in particular, the VNODE operation which initiated cloning would synchronize the file system on the LV as if the file system were being unmounted. The "unmount" system call would thereafter return an error if an attempt was made to unmount a cloned file system.

Several additional advantages arise from the foregoing system. First, shadow-paged blocks would be returned to their corresponding correct location as unshadowed page blocks in the file system once the clone mode is terminated. This, in turn, means that the data arrangement in the file system would be maintained. Moreover, most of the alteration necessary to effect the invention is in the LVM rather than in the file system, still further, no changes would be required to the on-disk JFS file system layout.

Turning to FIG. 5, illustrated therein is a representative flow diagram which may be implemented in program code for activating a clone logical volume. First, application-specific bufffer must be addressed, and thus a first step is to flush application data to disk, 120. In like manner, file system data must be addressed and accordingly a flush is then effected of file system data to disk, 122. Next, the file system log must be synced, and thus step 124 indicates a sync to the JFS log. Next, a flag indicating the clone state as active is turned on, 126, whereupon the READC call is activated, 128, and any read/write calls will thereafter be redirected to the translation table, 130. Upon completion of the foregoing, clone activation is complete, 132.

Figure 6:
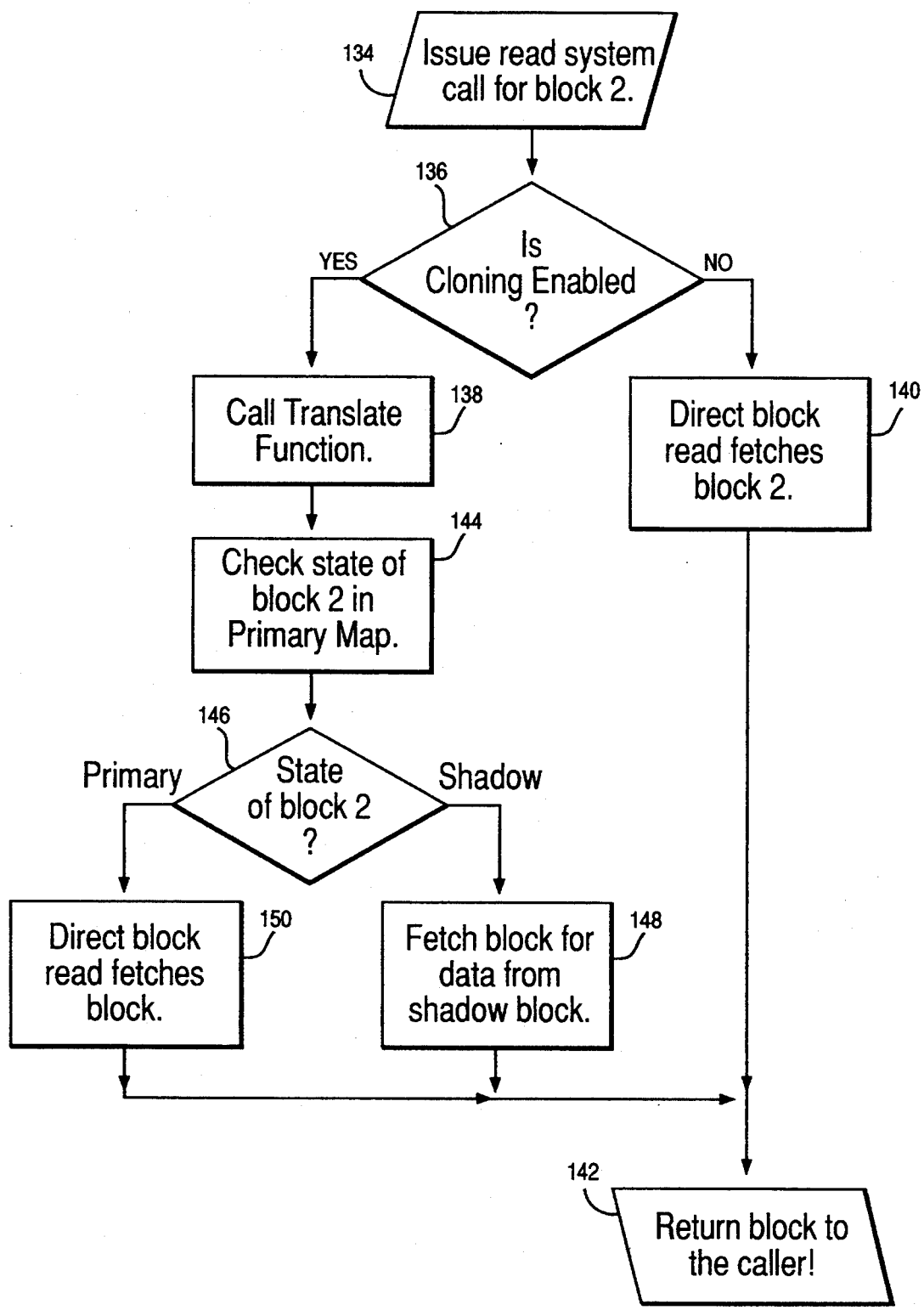
FIG. 6 is a flow diagram illustrating the sequence for reading a block from a clone logical volume.

FIG. 6 shows a more detailed flow diagram of the steps to be implemented in program code for reading a block from a clone LV. For purposes of the example, it will be assumed that block 2 is desired to be read. First, a READ system call for block 2 is issued, 134. A test is then made of whether cloning is enabled for the particular LV, 136. If not, a direct read will then be effected for the particular block, e.g. block 2 is fetched in this example, 140, whereupon the block is returned to the caller, 142.

Continuing with FIG. 6, if it is detected that the LV is in a clone state (indicated by the "yes" path exiting block 136), the translate function is called, 138, so as to employ the translation table previously described. Next, the state of the particular block to be read is checked in the primary map of the translation table, 144. A determination is then made of the state of the particular block such as block 2, e.g. whether it is in a primary or shadowed state, shown at reference numeral 146. If in a primary state, a direct block read fetches the particular block, 150, whereupon the block is returned to the caller, 142. If, on the other hand, the state of the block is shadowed, flow exits the right of block 146 whereupon a corresponding block of data is fetched from the shadow block, 148, corresponding to block 2. This shadowed block is then returned to the caller 142.

Figure 7:
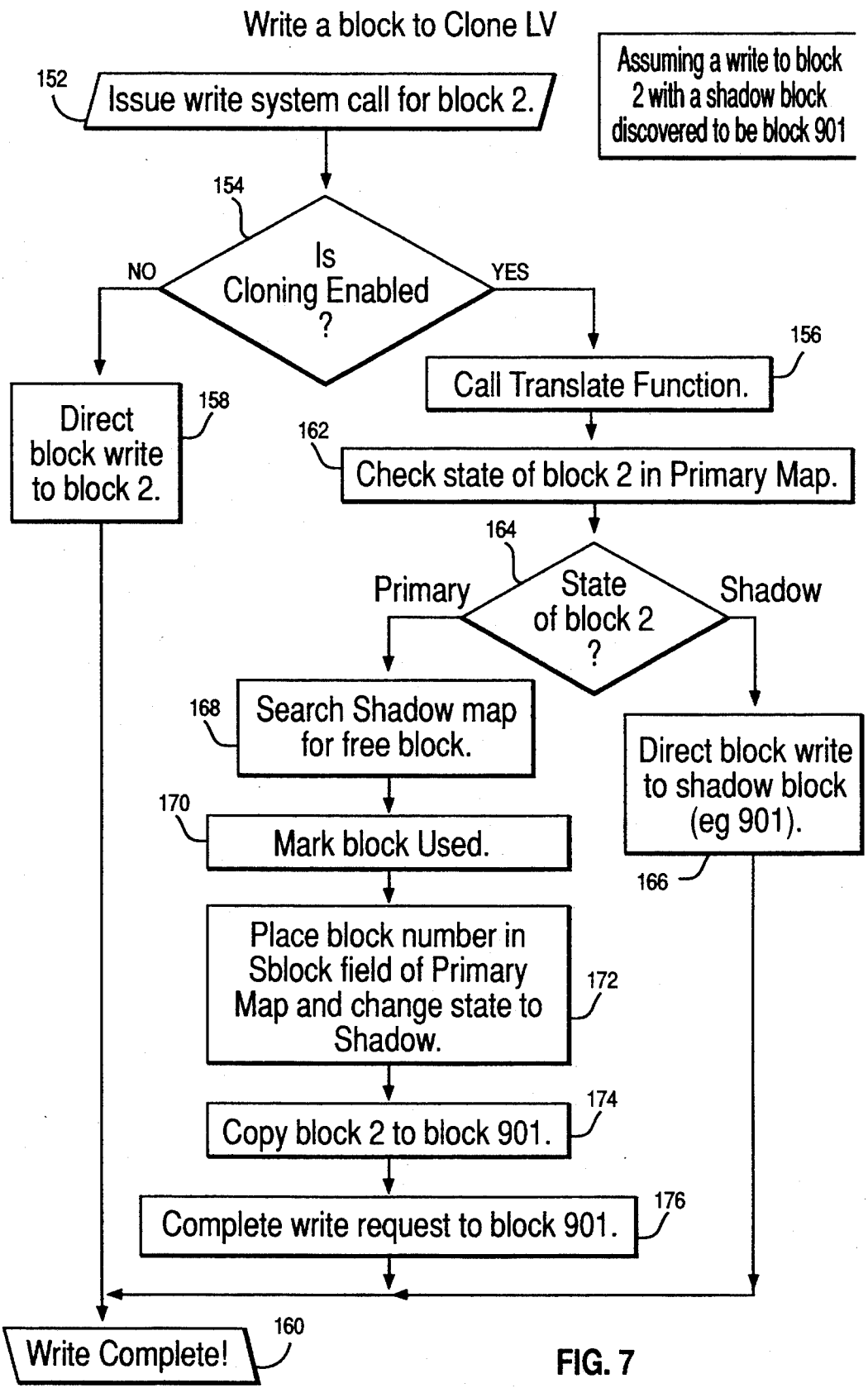
FIG. 7 is a flow diagram illustrating the sequence for writing a block to a clone logical volume.

Referring now to FIG. 7, a more detailed flow is provided which may be implemented in program code to effect a write of a block to a cloned LV. It will be assumed for illustrative purposes that a write is desired to block 2, with a shadow block discovered to be in block 901. First, a WRITE system call is issued for the particular block such as block 2, 152. As in the case of the READ, a check is then made to determine if cloning is enabled for the particular LV, 154. If not, flow exits to the left of block 154 whereupon a direct block write to block 2 occurs, 158, whereupon the write operation is completed, 160.

If the particular LV has been cloned (indicated by exiting block 154 along the "yes" path), the translate function is called, 156, to employ the translation table. The state of block is then checked in the primary map portion of the translation map, shown at block 162. If the state of the particular block is shadowed, tested at block 164, a direct block write to the corresponding shadow block (e.g. 901) is effected, 166, whereupon the write operation is completed, 160.

If, on the other hand, the state of the particular block such as block 2 is primary, the process exits the bottom of block 164 whereupon a search is made of the shadow map in the translation map for a free block, 168. Upon finding such a block, the block is marked "used" 170. The block number is then placed in the Sblock field of the primary map in the translation table and the state is changed to "shadow", 172. The particular block such as block 2 is thereafter copied to the corresponding block in the shadowed portion of memory such as block 901, shown at reference numeral 174. The WRITE request is then completed to the particular block such as block 901, shown at reference numeral 176, whereupon the write operation is complete, 160.

Figure 8:
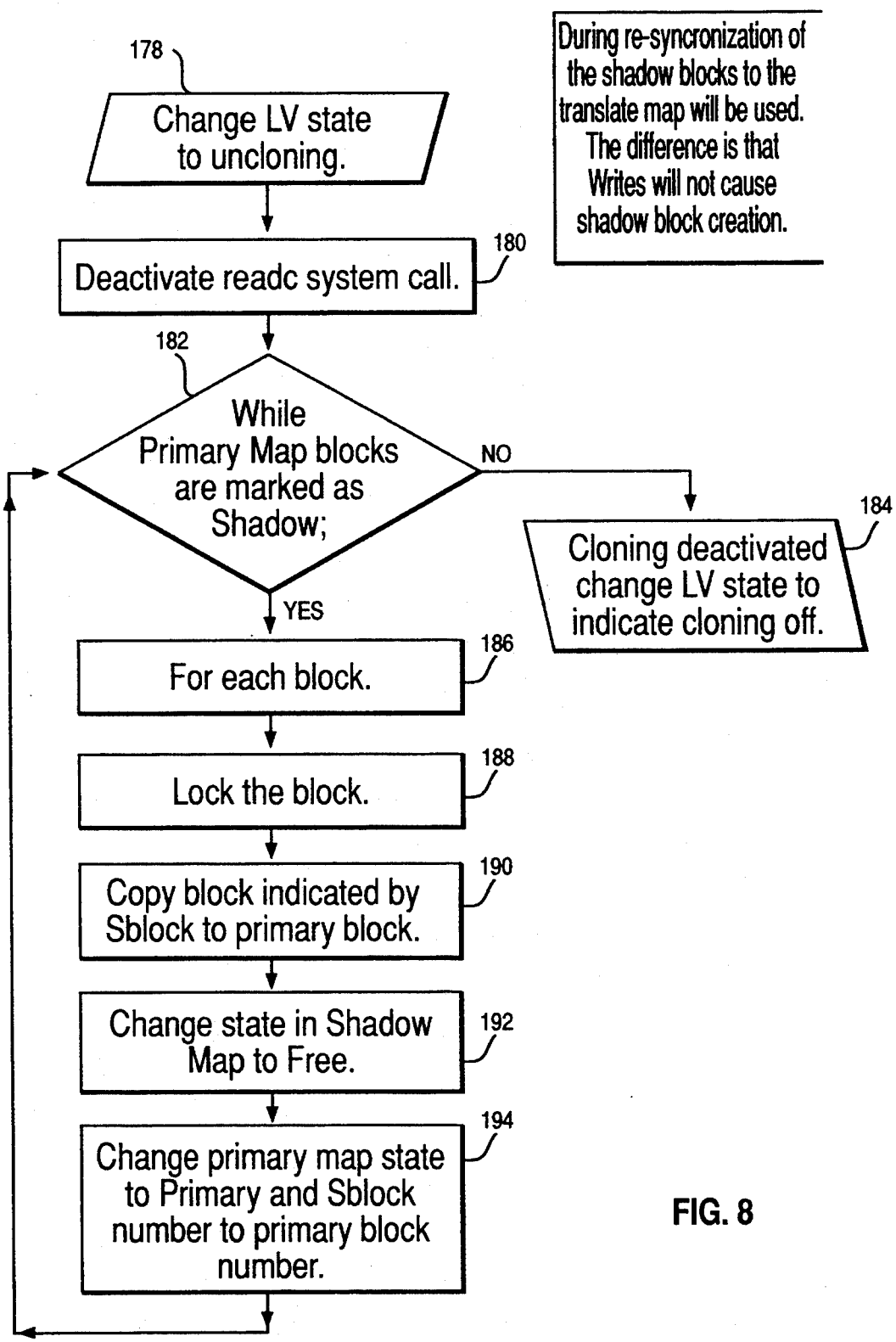
FIG. 8 is a flow diagram illustrating a sequence for deactivating a clone state of a logical volume.

Finally, turning to FIG. 8, an illustrative process which may also be implemented in program code is shown for deactivating the clone state of an LV. During resynchronization of the shadow blocks, the translation map will be used. However, WRITES will not cause shadow block creation. First, in the process, the LV' state is changed to UNCLONED, 178. The READC system call is deactivated, 180, and a test is then made of whether primary map blocks are being marked as shadowed. If not, cloning is deactivated, and the LV state is changed to indicate such deactivation, 184. If, on the other hand, primary map blocks are still marked as shadowed, the process exits through the bottom path of block 182. Then, for each block (shown at reference numeral 186), the particular block is locked, 188, the block indicated by the Sblock field in the translation map is copied back to the primary block 190, and the state is changed in the shadow map of the translation map to "free", 192. The primary map state is then changed to "Primary" and the Sblock number is changed to the primary block number, 194. The process then loops back to block 182, repeating the foregoing steps until no more primary map blocks are marked as shadowed, whereupon the cloned state of the LV no longer exists and thus cloning is deactivated, 184.

What is claimed is:

1. A computerized method for dynamically preserving a consistent state of primary data in a logical volume of a disk volume management system during runtime, comprising
   generating a file system command to clone said logical volume;
   reserving a portion of said logical volume for shadow-paged blocks in response to said file system command;
   generating a read/write translation map;
   generating a read command of a first page of said logical volume;
   detecting, in response to said read command, from a search of said map, whether a shadow page is allocated in said shadow-paged blocks corresponding to said first page; and
   reading said shadow page in response to said detecting that said shadow page corresponding to said first page is allocated.

2. The method of claim 1 further including
   generating a write command to a second page of said logical volume; and
   detecting, in response to said write command, from a search of said map, whether a shadow page is allocated in said shadow-paged blocks corresponding to said second page.

3. The method of claim 2 further including
   allocating said shadow page in response to said detecting that said shadow page corresponding to said second page is not allocated.

4. The method of claim 2 further including
   writing to said second page in response to detecting that said shadow page is allocated.

5. The method of claim 4 wherein said logical volume includes a portion of non-shadow paged blocks; and wherein said method further includes
   storing, in said map and in response to said writing, a correlation between at least one of said shadow-paged blocks and said non-shadow paged blocks.

6. The method of claim 5 wherein said at least one of said shadow-paged blocks includes said second page.

7. The method of claim 1 wherein said detecting and reading steps are performed during said runtime of said system.

8. The method of claim 4 wherein said writing step is during said runtime of said system.

9. The method of claim 5 further including
   reading from said portion of said non-shadow paged blocks while said portion of said logical volume is reserved for said shadow-paged blocks.

10. The method of claim 9 further including
    generating a log of said primary data; and
    prior to said detecting whether said shadow page is allocated corresponding to said first or said second page,
    committing said data to said disk; and
    running out said log.

11. Apparatus for dynamically preserving a consistent state of primary data in a logical volume of a disk volume management system during runtime, comprising
    means for generating a file system command to clone said logical volume;
    means for reserving a portion of said logical volume for shadow-paged blocks in response to said file system command;
    means for generating a read/write translation map;

means for generating a read command of a first page of said logical volume;

means for detecting, in response to said read command, from a search of said map, whether a shadow page is allocated in said shadow-paged blocks corresponding to said first page; and means for reading said shadow page in response to said detecting that said shadow page corresponding to said first page is allocated.

12. The apparatus of claim 11 further including means for generating a write command to a second page of said logical volume; and means for detecting, in response to said write command, from a search of said map, whether a shadow page is allocated in said shadow-paged blocks corresponding to said second page.

13. The apparatus of claim 12 further including means for allocating said shadow page in response to said detecting that said shadow page corresponding to said second page is not allocated.

14. The apparatus of claim 12 further including means for writing to said second page in response to detecting that said shadow page is allocated.

15. The apparatus of claim 14 wherein said logical volume includes a portion of non-shadow paged blocks; and wherein said apparatus further includes means for storing, in said map and in response to said writing, a correlation between at least one of said shadow-paged blocks and said non-shadow paged blocks.

16. The apparatus claim 15 wherein said at least one of said shadow-paged blocks includes said second page.

17. The apparatus of claim 11 wherein said means for correlating includes shadow map means for indicating used or unused states of said shadow-paged blocks.

18. The apparatus of claim 17 wherein said means for correlating further includes primary disk map means for indicating whether said non-shadow paged blocks are shadow-paged.

19. The apparatus of claim 15 further including means for reading from said portion of said non-shadow paged blocks while said portion of said logical volume is reserved for said shadow-paged blocks.

20. The apparatus of claim 19 further including means for generating a log of said primary data; and means for committing said data to said disk prior to said detecting whether said shadow page is allocated corresponding to said first or said second page.

* * * * *